(12) United States Patent
Lassa

(10) Patent No.: US 8,760,922 B2
(45) Date of Patent: Jun. 24, 2014

(54) SYSTEM AND METHOD FOR MICRO-TIERING IN NON-VOLATILE MEMORY

(75) Inventor: Paul A. Lassa, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 4 days.

(21) Appl. No.: 13/443,404

(22) Filed: Apr. 10, 2012

(65) Prior Publication Data

US 2013/0265825 A1 Oct. 10, 2013

(51) Int. Cl.
G11C 11/34 (2006.01)

(52) U.S. Cl.
USPC .................................. 365/185.11; 365/185.24

(58) Field of Classification Search
USPC ......................................... 365/185.11, 185.24
See application file for complete search history.

(56) References Cited

U.S. PATENT DOCUMENTS

| | | | |
|---|---|---|---|
| 7,136,973 B2 | 11/2006 | Sinclair | |
| 7,302,534 B2 | 11/2007 | Sinclair | |
| 7,631,245 B2 | 12/2009 | Lasser | |
| 2008/0307192 A1 | 12/2008 | Sinclair et al. | |
| 2010/0023800 A1 | 1/2010 | Harari et al. | |
| 2010/0037002 A1 | 2/2010 | Bennett | |
| 2010/0042908 A1 | 2/2010 | Radke | |
| 2010/0095053 A1 | 4/2010 | Bruce et al. | |
| 2010/0199036 A1 | 8/2010 | Siewert et al. | |
| 2010/0250798 A1 | 9/2010 | Eilert | |
| 2011/0040924 A1 | 2/2011 | Selinger | |
| 2011/0041005 A1 | 2/2011 | Selinger | |
| 2011/0041039 A1 | 2/2011 | Harari et al. | |
| 2011/0161554 A1 | 6/2011 | Selinger et al. | |
| 2011/0161784 A1 | 6/2011 | Selinger et al. | |
| 2012/0109896 A1* | 5/2012 | Abraham et al. | 707/659 |
| 2012/0110244 A1* | 5/2012 | Feeley et al. | 711/103 |
| 2012/0215958 A1* | 8/2012 | Fai et al. | 710/316 |
| 2013/0031315 A1* | 1/2013 | Abdulla et al. | 711/149 |
| 2013/0031326 A1* | 1/2013 | Grunzke | 711/167 |

* cited by examiner

Primary Examiner — Michael Tran
(74) Attorney, Agent, or Firm — Brinks Gilson & Lione

(57) ABSTRACT

In a storage device such as a solid state disk (SSD), a central controller communicates with a plurality of multi-chip memory packages. Each multi-chip memory package comprises a plurality of memory dies and a local processor, wherein the plurality of memory dies includes different memory tiers. The central controller may handle management of the virtual address space while the local processor in each MCP manages the storage of data within memory tiers in the memory dies of its respective MCP.

18 Claims, 9 Drawing Sheets

SYSTEM AND METHOD FOR
MICRO-TIERING IN NON-VOLATILE
MEMORY

BACKGROUND

A solid state drive (SSD) is designed to provide reliable and high performance storage of user data across a flash-based memory system containing a host interface controller (such as a Serial Advanced Technology Attachment (SATA)) interface) and a number of memory multi-chip packages (MCPs), where each MCP contains a stack of NAND flash dies and, optionally, a flash memory controller. In a typical SATA-based SSD application, a central host controller accesses multiple attached devices (targets/NAND device clusters) on each flash interface channel, and across several flash interface channels. A typical central host controller would include a SATA interface and four, eight, or more flash interface channels. These channels may utilize a standard flash interface protocol, such as ONFI. The Open NAND Flash Interface (ONFI) protocol provides support for parallel access to multiple NAND dies (or "logical units" (LUNs)) on a single "target" or NAND multi-chip stack on a single shared ONFI channel. Each ONFI target typically controls 2, 4, or 8 NAND dies. Storage management software running on the central host controller manages a virtual memory space that is mapped to flash blocks in the physical dies in each of the attached MCP's. The central host controller and the storage management software utilize parallel access and efficient usage of the available flash devices to optimize SSD drive performance, endurance, and cost.

SUMMARY

The present invention is defined by the claims, and nothing in this section should be taken as a limitation on those claims.

By way of introduction, the embodiments described below provide a mass storage memory device having a central host controller and multiple local controllers. Each of the local controllers is part of a respective multi-chip memory package (MCP) that includes a plurality of memory dies. The mass storage memory device includes one or more interfaces through which the plurality of multi-chip memory packages may communicate with the central host controller. A first portion of the plurality of memory dies in each multi-chip memory package is configured as a first type of non-volatile storage and a second portion of the plurality of memory dies is configured as a second type of non-volatile storage. The local controller in each multi-chip package is configured to receive host data in a pre-determined logical block address range from the central host controller, determine a storage criteria for the received data, and based on the determined storage criteria, select between one of the first portion or the second portion of memory dies for storing the received data. The local controller then manages which of the portions or "tiers" of the memory dies in which the received data is stored, wherein the performance of the mass storage device may be enhanced by local controller management of data within the different tiers available in each MCP.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

Introduction

Figure 1:
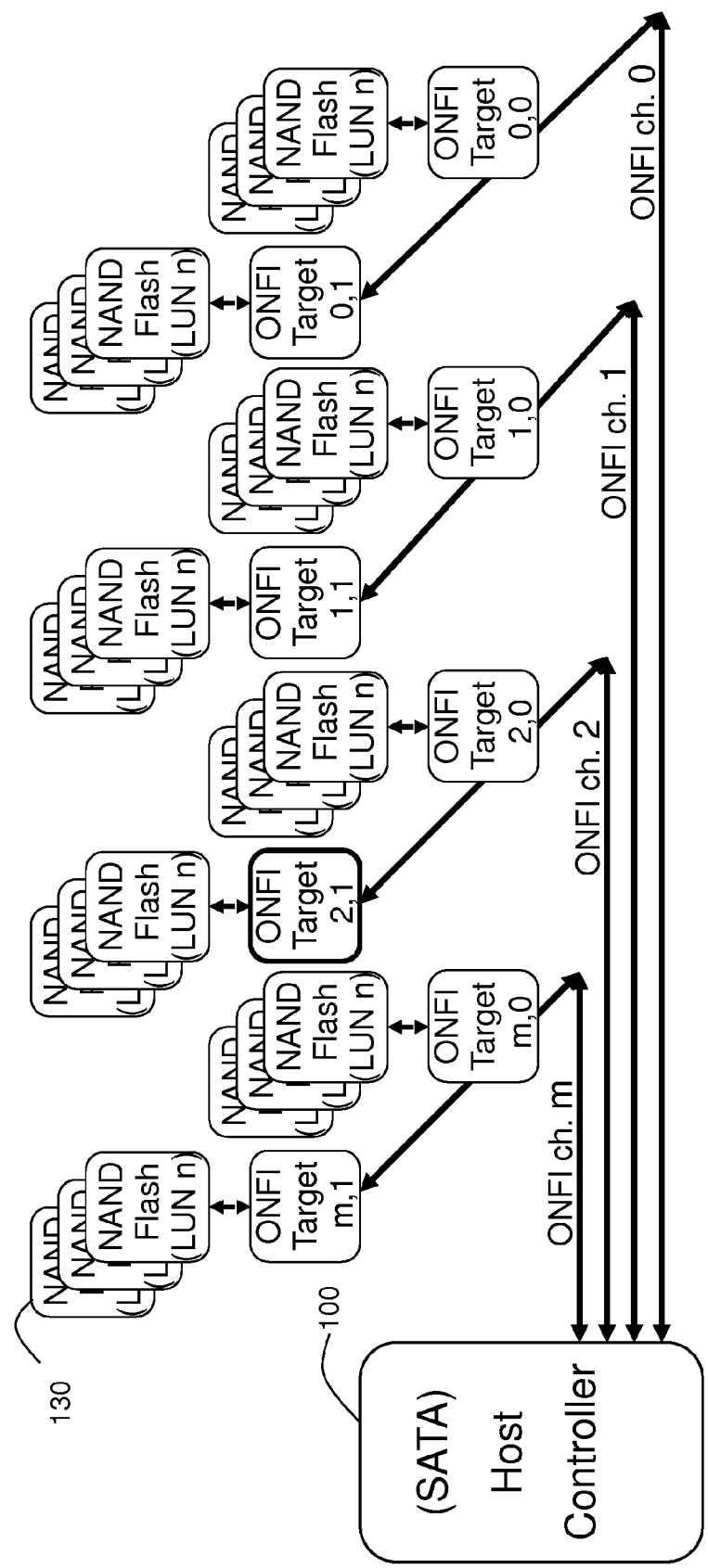
FIG. 1 is a block diagram of a memory system of an embodiment.

The following embodiments relate generally to a system and method for handling data storage in MCPs that are compound targets, where a compound target is defined herein as mixed technology flash array having logical units (LUNs) (i.e., memory die) configured with high-performance access regions and configured with high-capacity, but lower performance regions. For example, the high-performance regions may be binary flash (single level cell or SLC flash) while the high-capacity regions may be multi-level cell (MLC) flash. The MLC flash regions may be 2, 3 or more bit-per-cell configurations, and the MCPs may include more than just two types of performance regions (i.e. more than a high-performance flash and a high-capacity, lower performance flash arrangement).

As was discussed above, storage management software running on a central host controller can manage a virtual memory space that is mapped to flash blocks in the physical dies of multi-chip packages in order to provide parallel access and efficient usage of the memory. To provide such parallelism, metablocks can be formed from blocks in a given memory die position across several multi-chip packages. However, the further optimization of SSD performance to take advantage of the different performance levels of the different regions in each MCP can load down a central host processor. The following embodiments can be used to provide distributed management and optimization of different performance flash regions in the different MCPs of an SSD. By passing responsibility from the host processor to each MCP for selecting which tier (e.g. region) of memory in the MCP would be best for data in that MCP, it is expected that better cost-performance and better endurance may be achieved.

The following embodiments may provide certain advantages over systems where management of mixed regions of all flash components in a memory system is completely centralized. Disadvantages of the completely centralized control technique of mixed region management includes the self-evident issue that the entire processing burden is borne by the central processor/controller, requiring increasing processing power (die-size, etc.) as the number of managed dies is scaled upward. Related to the processing burden issue is that, for a set or available central processor, scaling up to more managed flash dies (to provide higher SSD capacities) limits the sophistication or amount of processing capability available per device or for all flash components in the aggregate. The extent of central statistics tracking may be practically constrained by the available processing bandwidth and table storage resources that are shared with the central processor's other operation threads. A centralized architecture means the central processor tends to each and every die one at a time, versus the many at once in parallel or "fire and forget" offered by the distributed architecture described herein. Additionally, data relocation optimizations (copies) occupy an increasing portion of the host bus/channel to flash bandwidth as more flash devices are centrally managed, likely producing a negative impact to user data command response time. Finally, error correction and error/exception handling of increasing numbers of flash dies adds processing burden to the central host controller, versus offloading to distributed "local" processors.

While typical consumer SSD capacities (fewer die) have been low in recent years, making the centralized approach suitable, the marketplace shows a trend of increasing capacities (larger number of flash die), where the embodiments discussed below offer a scalable improvement over strictly centralized management.

Before turning to details of these embodiments, the following section discusses exemplary architectures.

Exemplary Architectures

Turning now to the drawings, FIG. 1 is a block diagram of a memory system of an embodiment. As shown in FIG. 1, a central host controller 100 is in communication with a plurality of multi-chip memory packages via one or more interfaces (here, ONFI channels). (As used herein, the phrase "in communication with" means directly in communication with or indirectly in communication with through one or more components, which may or may not be shown or described herein.) Here, the controller 100 accesses (on each ONFI channel and across several ONFI channels) multiple attached ONFI targets. Each multi-chip memory package (called a "target" in FIG. 1) comprises a plurality of memory dies (NAND Flash LUNs) and, optionally, a local MCP controller (not shown). The central host controller 100 also has a processor (also referred to herein as a "central host processor") configured to perform various actions, which will be described in detail below. The central host controller 100 can have on-board memory (e.g., SRAM) and/or external memory (e.g., DDR DRAM) to store executable program code (software or firmware) and other user data and system control data or structures used in its operations. In one embodiment, the memory system is part of a solid-state drive (SSD), and, in another embodiment, the central host controller 100 is used in OEM designs that use a Southbridge controller to interface to flash memory devices. Of course, these are merely examples, and other implementations can be used.

As mentioned above, central host controller 100 is a host controller. A "host" is any entity that is capable of accessing the one or more flash memory device(s) through the central host controller 100, either directly or indirectly through one or more components named or unnamed herein. A host can take any suitable form, such as, but not limited to, a personal computer, a mobile phone, a game device, a personal digital assistant (PDA), an email/text messaging device, a digital camera, a digital media (e.g., MP3) player, a GPS navigation device, a personal navigation system (PND), a mobile Internet device (MID), and a TV system. Depending on the application, the host can take the form of a hardware device, a software application, or a combination of hardware and software.

Also, "flash memory device(s)" refer to device(s) containing a plurality of flash memory cells and any necessary control circuitry for storing data within the flash memory cells. In one embodiment, the flash memory cells are NAND memory cells, although other memory technologies, such as passive element arrays, including one-time programmable memory elements and/or rewritable memory elements, can be used. (It should be noted that, in these embodiments, a non-NAND-type flash memory device can still use a NAND interface and/or NAND commands and protocols.) Also, a flash memory device can be a single memory die or multiple memory dies. Accordingly, the phrase "a flash memory device" used in the claims can refer to only one flash memory device or more than one flash memory device.

Figure 2:
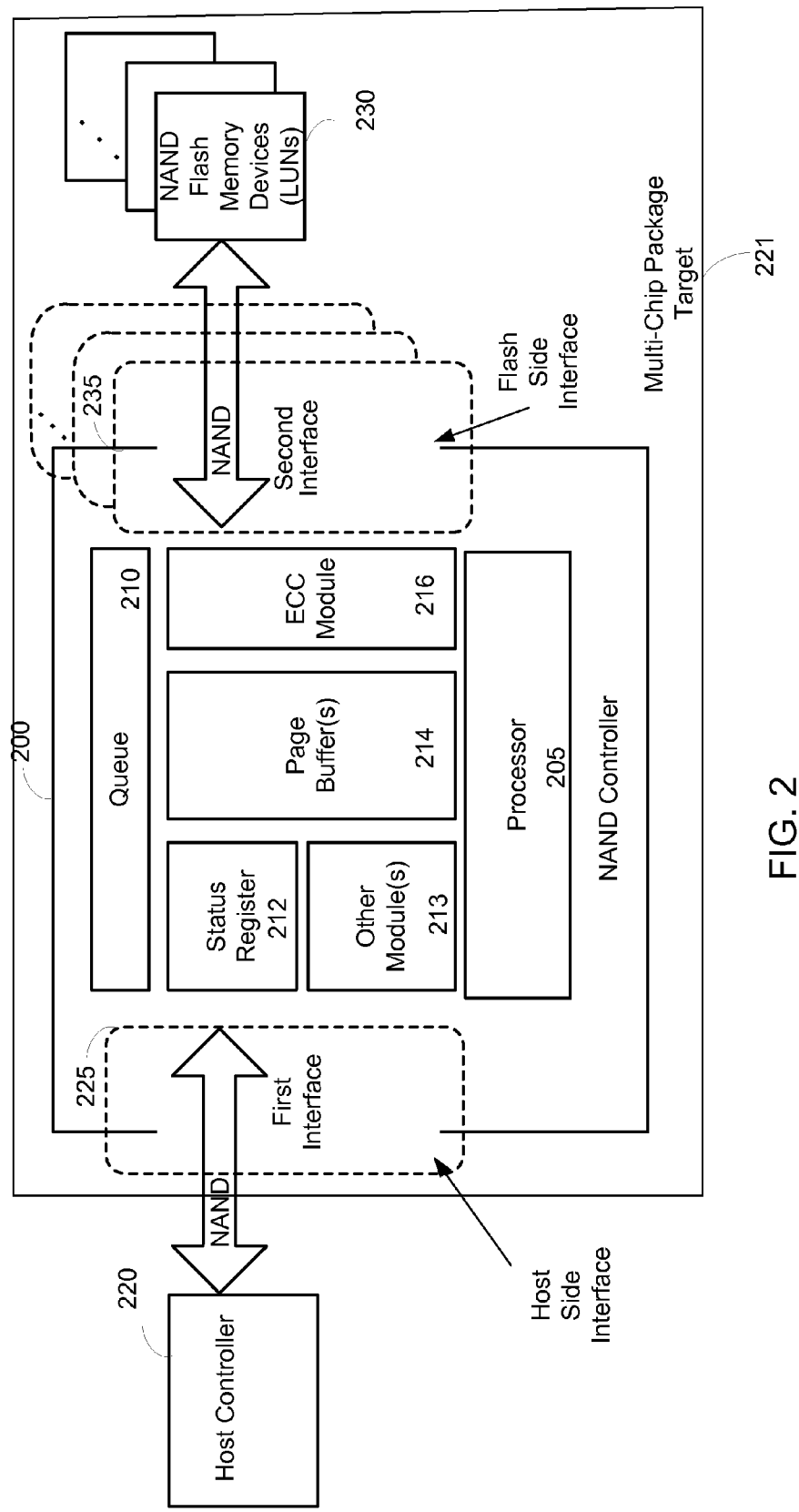
FIG. 2 is a block diagram of a multi-chip package of an embodiment.

Returning to the drawings, FIG. 2 illustrates a "target" multi-chip package 221 and a central host controller 220 of an embodiment. As shown in FIG. 2, the multi-chip package 221 has a local controller, also referred to herein as a NAND controller, 200 having a local processor 205, a queue (memory) 210, one or more status registers 212, one or more other module(s) 213, one or more page buffers 214, and an error correction code (ECC) module 216. (The NAND controller 200 can contain other components, which are not shown in FIG. 2 to simplify the drawing.) As used herein, a "module" can include hardware, software, firmware, or any combination thereof. Examples of forms that a "module" can take include, but are not limited to, one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. The "other module(s) 213" can perform any desired function(s), such as, but not limited to, data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). Further information about these various functions is described in U.S. patent application Ser. Nos. 12/539,394; 12/539,407; 12/539,379; 12/650,263; 12/650,255; and 12/539,417, which are hereby incorporated by reference.

While the NAND controller 200 and flash memory device(s) 230 are shown as two separate boxes, it should be understood that the NAND controller 200 and flash memory device(s) 230 can be arranged in any suitable manner (e.g., packaged in different packages, packaged within a common multi-chip package, and or integrated on a same die). In any of these arrangements, the local (NAND) controller can be physically located separately from the central host controller 220. This allows the NAND controller and flash memory device(s) to be considered a separate circuitry unit, which can be used with a wide variety of central host controllers 220.

The NAND controller 200 communicates with the central host controller 220 using a first interface 225 and communicates with the flash memory device(s) 230 using second interface(s) 235. The first and second interfaces can be NAND interfaces operating under NAND interface protocols. Examples of NAND interfaces include, but are not limited to, Open NAND Flash Interface (ONFI), toggle mode (TM), and a high-performance flash memory interface, such as the one described in U.S. Pat. No. 7,366,029, which is hereby incorporated by reference. The NAND controller 200 may optionally include one or more additional host-side interfaces, for interfacing the NAND controller 200 to hosts using non-NAND interfaces, such as SD, USB, SATA, or MMC interfaces. Also, the interfaces 225, 235 can use the same or different NAND interface protocols.

In general, a NAND interface protocol is used to coordinate commands and data transfers between a NAND flash device and a host using, for example, data lines and control signals, such as ALE (Address Latch Enable), CLE (Command Latch Enable), and WE# (Write Enable). Even though the term "NAND interface protocol" has not, to date, been formally standardized by a standardization body, the manufacturers of NAND flash devices all follow very similar protocols for supporting the basic subset of NAND flash functionality. This is done so that customers using NAND devices within their electronic products could use NAND devices from any manufacturer without having to tailor their hardware or software for operating with the devices of a specific vendor. It is noted that even NAND vendors that provide extra functionality beyond this basic subset of functionality ensure that the basic functionality is provided in order to provide compatibility with the protocol used by the other vendors, at least to some extent.

A given device (e.g., a controller, a flash memory device, a host, etc.) is said to comprise, include, or have a "NAND interface" if the given device includes elements (e.g., hardware, software, firmware, or any combination thereof) necessary for supporting the NAND interface protocol (e.g., for interacting with another device using a NAND interface protocol). (As used herein, the term "interface(s)" can refer to a single interface or multiple interfaces. Accordingly, the term "interface" in the claims can refer to only one interface or more than one interface.) In this application, the term "NAND Interface protocol" (or "NAND interface" in short) refers to an interface protocol between an initiating device and a responding device that, in general, follows the protocol between a host and a NAND flash device for the basic read, write, and erase operations, even if it is not fully compatible with all timing parameters, not fully compatible with respect to other commands supported by NAND devices, or contains additional commands not supported by NAND devices. One suitable example of a NAND interface protocol is an interface protocol that uses sequences of transferred bytes equivalent in functionality to the sequences of bytes used when interfacing with a Toshiba TC58NVG1S3B NAND device (or a Toshiba TC58NVG2D4B NAND device) for reading (opcode 00H), writing (opcode 80H), and erasing (opcode 60H), and also uses control signals equivalent in functionality to the CLE, ALE, CE, WE, and RE signals of the above NAND device.

It is noted that a NAND interface protocol is not symmetric in that the host—not the flash device—initiates the interaction over a NAND interface. Further, an interface (e.g., a NAND interface or an interface associated with another protocol) of a given device (e.g., a controller) may be a "host-side interface" (e.g., the given device is adapted to interact with a host using the host-side interface), or the interface of the given device may be a "flash memory device-side interface" (e.g., the given device is adapted to interact with a flash memory device using the flash memory device-side interface). The terms "flash memory device-side interface," "flash device-side interface," and "flash-side interface" are used interchangeably herein.

These terms (i.e., "host-side interface" and "flash device-side interface") should not be confused with the terms "host-type interface" and "flash-type interface," which are terminology used herein to differentiate between the two sides of a NAND interface protocol, as this protocol is not symmetric. Furthermore, because it is the host that initiates the interaction, we note that a given device is said to have a "host-type interface" if the device includes the necessary hardware and/or software for implementing the host side of the NAND interface protocol (i.e., for presenting a NAND host and initiating the NAND protocol interaction). Similarly, because the flash device does not initiate the interaction, we note that a given device is said to have a "flash-type interface" if the device includes the necessary hardware and/or software for implementing the flash side of the NAND protocol (i.e., for presenting a NAND flash device).

Typically, "host-type interfaces" (i.e., those which play the role of the host) are "flash device-side interfaces" (i.e., they interact with flash devices or with hardware emulating a flash device) while "flash device-type interfaces" (i.e., those which play the role of the flash device) are typically "host-side interfaces" (i.e., they interact with hosts or with hardware emulating a host).

Additional information about exemplary controllers (and their advantages over prior controllers) can be found in U.S. Pat. No. 7,631,245 and U.S. patent application Ser. Nos. 12/539,394; 12/539,407; 12/539,379; 12/650,263; 12/650,255; and 12/539,417, which are hereby incorporated by reference.

Figure 3:
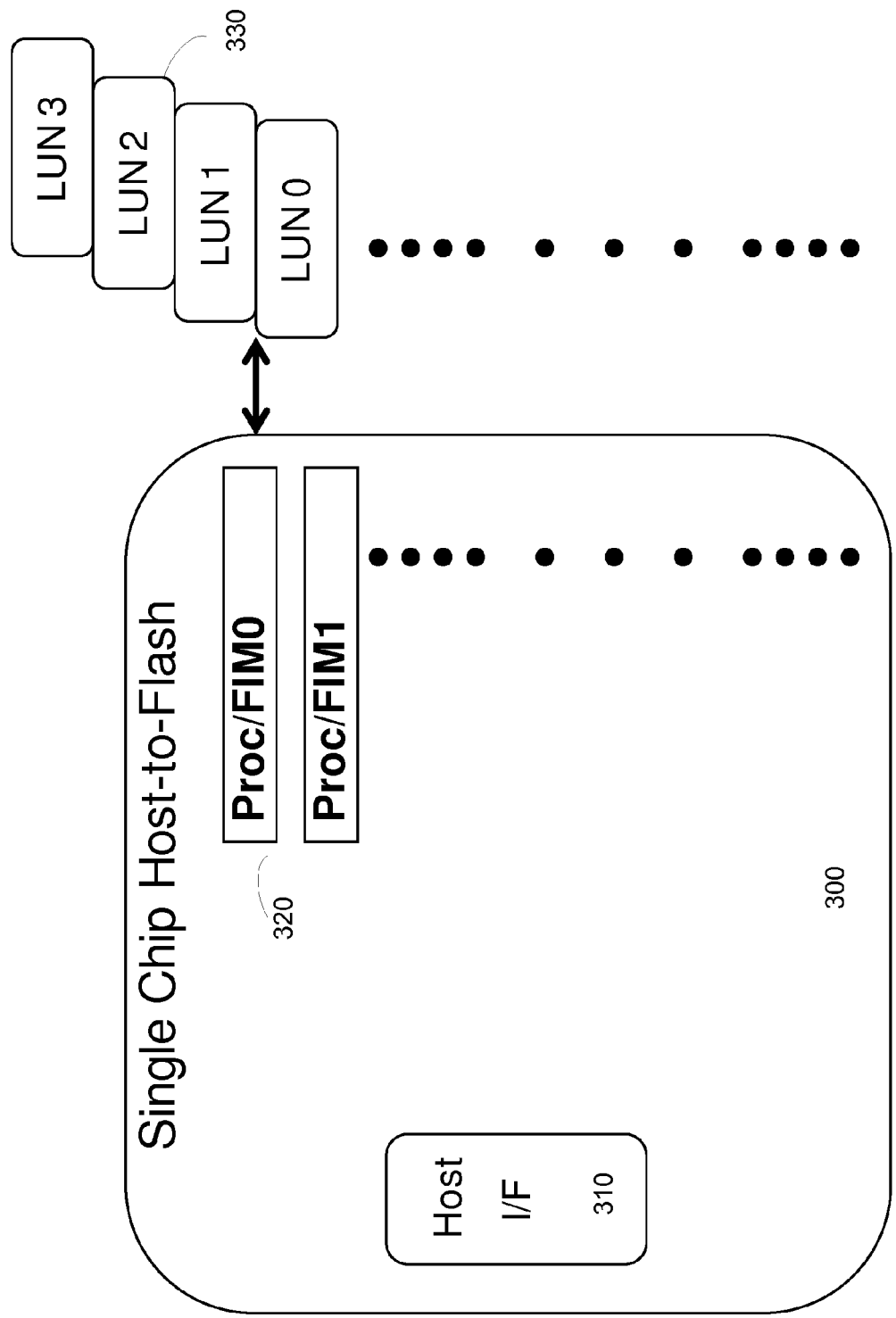
FIG. 3 is a block diagram of an architecture of an embodiment.
Figure 4:
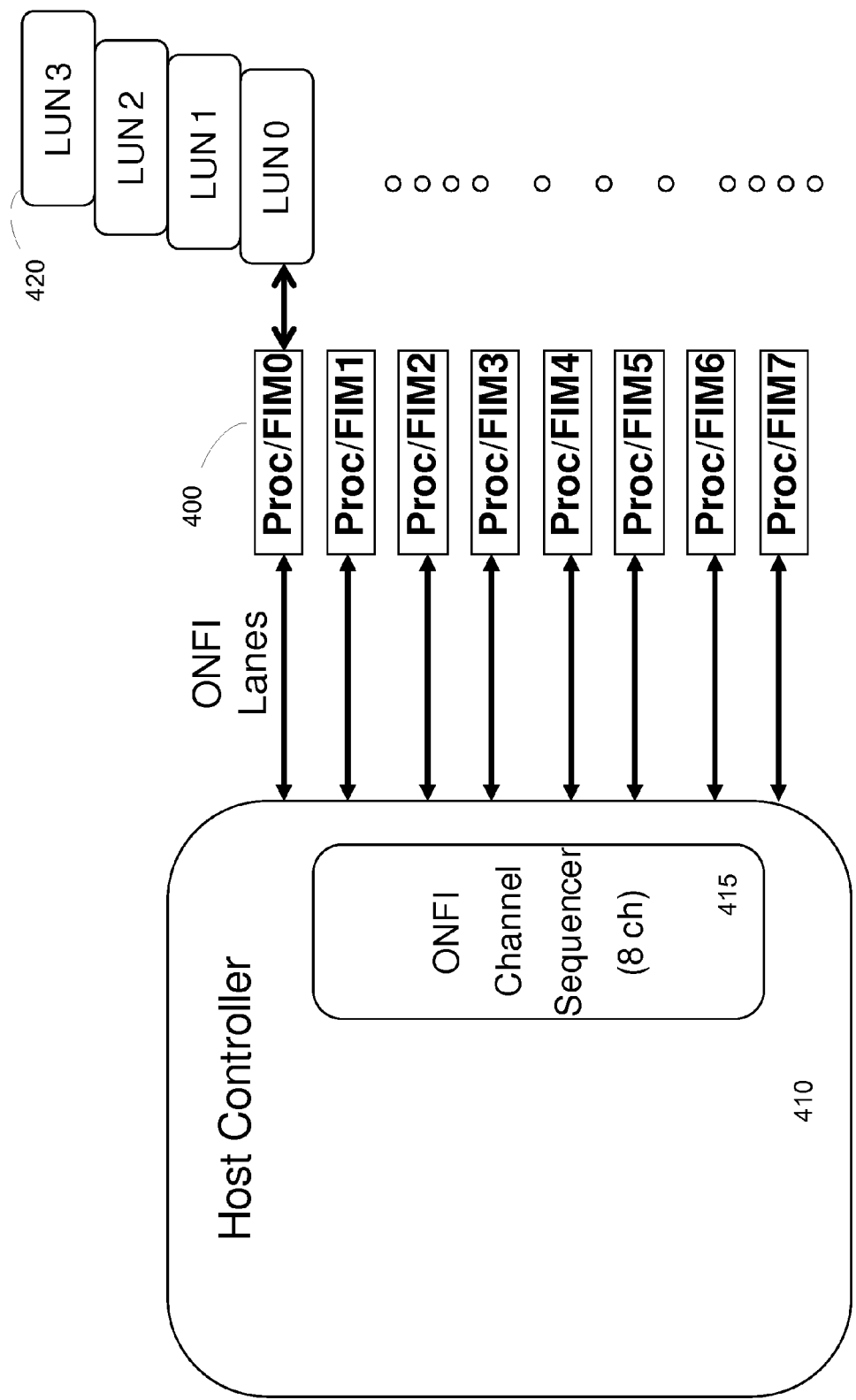
FIG. 4 is a block diagram of an architecture of an embodiment.
Figure 5:
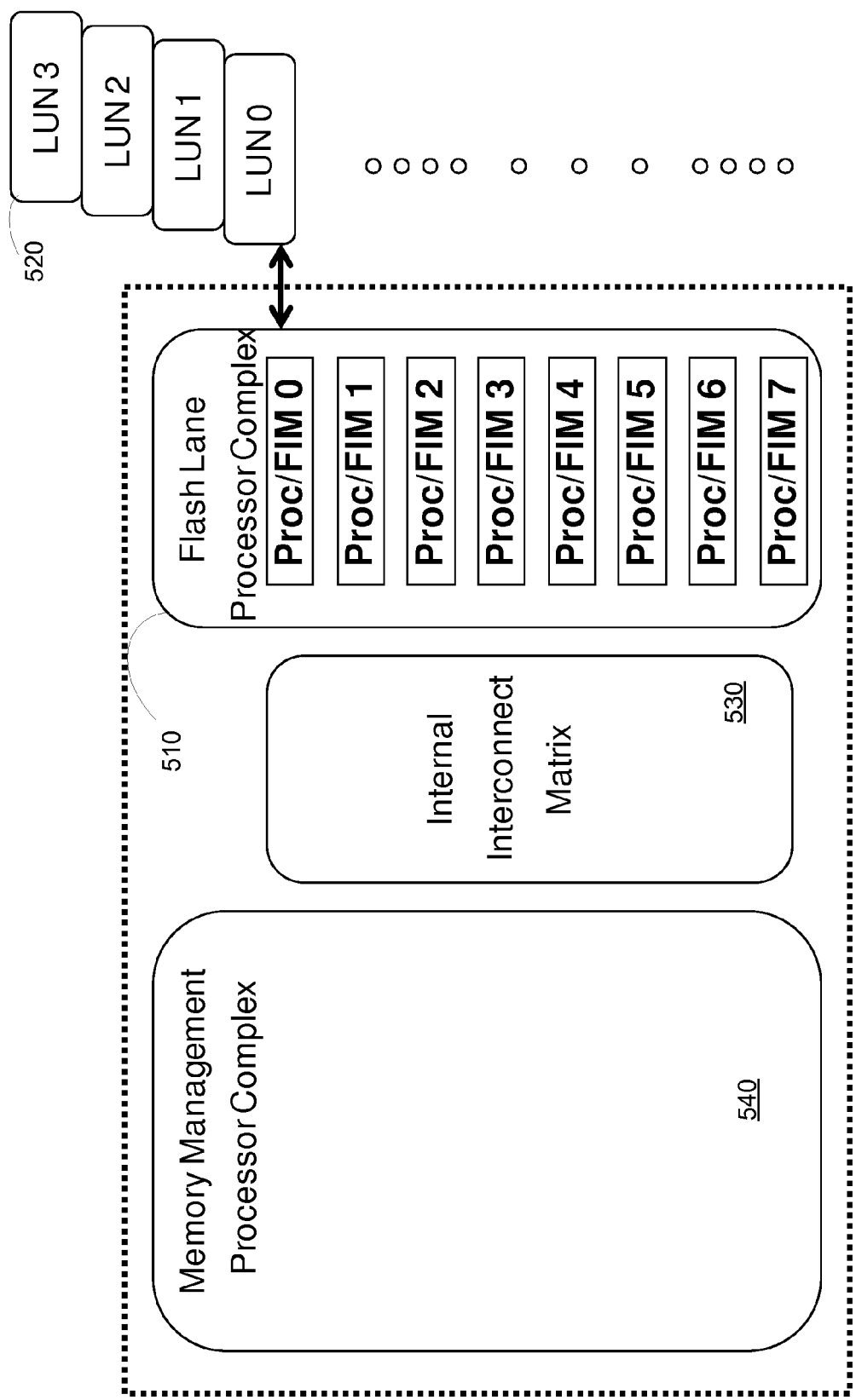
FIG. 5 is a block diagram of an architecture of an embodiment.

It should also be noted that other controller architectures can be used. For example, FIG. 3 illustrates a single chip host-to-flash controller 300. This controller 300 contains a host interface 310 and a plurality of processor/flash interface modules (FIMs) 320. Each of the processor/FIMs is connected to a respective plurality of flash memory devices (LUNs). In another embodiment (shown in FIG. 4), instead of the plurality of processor/FIMs being inside a single controller, each processor/FIM 400 communicates individually with an ONFI channel sequencer 415 in the host controller via respective ONFI lanes. As in FIG. 3, each processor/FIM 400 in this embodiment is connected to a plurality of flash memory devices (LUNs) 420. In yet another embodiment (shown in FIG. 5), the controller contains a flash lane processor complex 510 that contains a plurality of processor/FIMs connected to a plurality of flash memory devices (LUNs) 520. The flash lane processor complex 510 is connected via an internal interconnect matrix 530 to a memory management processor complex 540, that manages the operation of the memory. Of course, these are just examples of some of the architectures that can be used; others can be used. The claims should not be limited to a particular type of architecture unless explicitly recited therein.

The three example architectures above illustrate the variations on how a host platform (PC, laptop, etc.), host interface controller (such as SATA, PCIe, etc.), or simply one or more host processes or execution threads within an integrated storage complex or system on a chip (SOC) may produce a plurality of memory storage, memory management, or device maintenance or health operations destined for one or more exemplary flash memory controller lanes, processes, or execution threads.

Now that exemplary controller architectures have been described, the following section provides more information about the embodiments related to micro-tiering in mixed flash device storage environments.

Embodiments Relating to Micro-Tiering

As mentioned above, storage management software running on a central host controller can manage a virtual memory space that is mapped to flash blocks in the physical dies of multi-chip packages in order to provide parallel access and efficient mapping, usage, and compaction of the available blocks in the memories to achieve optimal solid-state drive performance. To provide such parallelism, a metablock can be formed from blocks in a given memory die position across the multi-chip package. Efficient software handling of data on these metablocks is often achieved if the metablocks are made up of a regular, power-of-two number of blocks. In the memory system shown in FIG. 1, storage management software, also referred to as a memory management layer (MML), may achieve optimal workload performance by striping metablocks such that they access one or two LUNs across four or eight ONFI channels. Any of a number of types of storage management software may be used. In one embodiment, the storage management software may be a page based management system such as storage address re-mapping (STAR). STAR management software may be executed on the central host controller to manage a virtual memory space that is mapped to flash blocks in physical die in each of the attached MCP's. The central host controller and STAR software may utilize parallel access and efficient usage of the available flash devices in the SSD to optimize SSD Drive performance, endurance, and cost. STAR manages logical groups of data on a page level in logical address space by, in one implementation, re-mapping logical block addresses assigned by a host device to a different virtual storage address system for the SSD. The virtual storage addresses may then be mapped to physical addresses. More detail on the STAR memory management techniques may be found in U.S. application Ser. No. 12/036,014, filed Feb. 22, 2008 (US Pub. No. 2008/0307192), the entirety of which is hereby incorporated herein by reference.

In addition to the general memory management functions that a memory management system such as STAR handles, further memory management functions relating to optimization of memory type usage in a multi-chip package can be utilized. For example, when two or more different flash memory types, also referred to as tiers, are present in the LUNs for a multi-chip package, certain performance characteristics may be managed to enhance the ability of each of the multi-chip packages in the memory system to provide a high performance at a lower cost and to improve memory endurance. Tiered storage may be defined as a data storage environment consisting of two or more kinds of storage delineated by differences in at least one of four attributes: price, performance, capacity, or function. Any significant difference in one or more of the four defining attributes can be sufficient to justify a separate storage tier. In the case of different flash types, such as a mixed flash MCP with binary and MLC regions, each of the two types of regions would qualify as separate tiers based on differences in three of the identified criteria (price, performance and capacity) between the two regions.

Figure 6B:
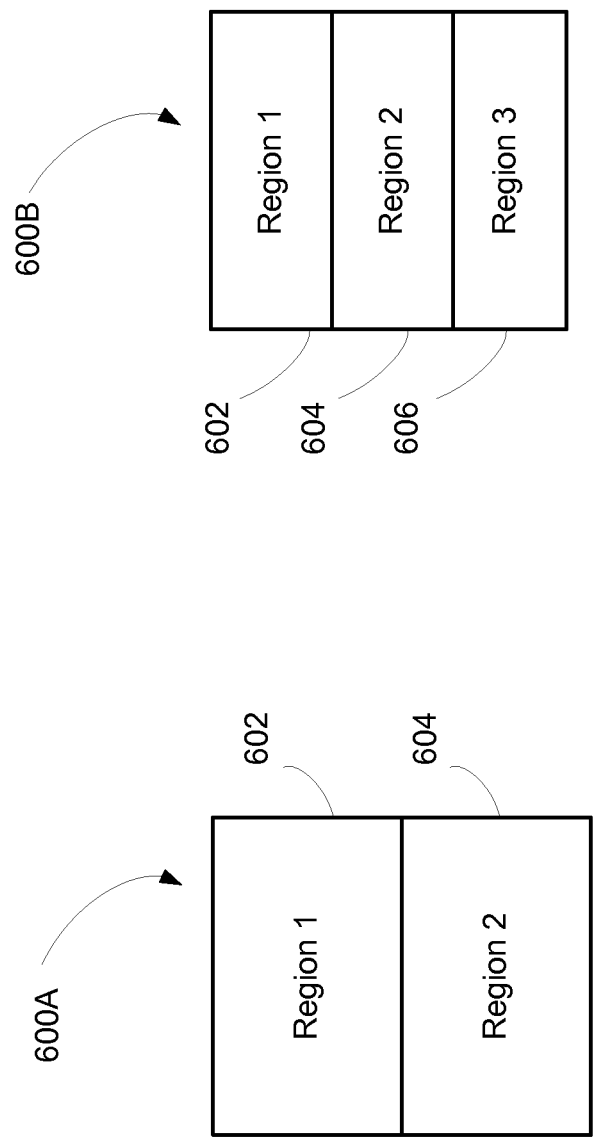
FIGS. 6A-6B illustrate alternate configurations of storage tiers in LUNs within the MCP of FIG. 2.
Figure 6A:
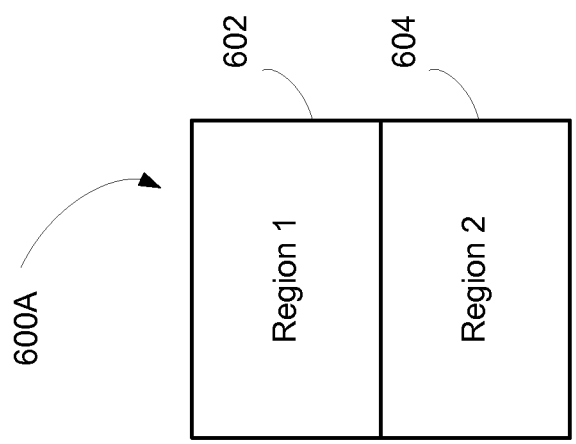

Each MCP may be a compound target having different types of memory, or tiers, in the same MCP. For example, the MCP may include LUNs (also referred to as dies) that are each made up of a single type of flash memory, but the type of flash memory differs between LUNs, or each LUN may include different flash memory regions, within the LUN itself where each flash memory region is a different type of flash memory. FIGS. 6A and 6B illustrate a single LUN (die) having multiple regions. An example of a single LUN 600 having two different regions is illustrated in FIG. 6A. Here, the LUN 600A may have a first region 602 with 1 bit per cell flash memory, also known as single level cell (SLC) or binary flash, while another region 604 is a multi-level cell (MLC) region such as 2 bit per cell flash memory. More than two flash memory regions may be included in a LUN 600B as illustrated in FIG. 6B, such as SLC in a first region 602, a first type of MLC in a second region 604, and a second type of MLC (e.g. three bit per cell flash memory) in a third region 606. In other embodiments, the LUNs in a given MCP may include a combination of LUNs with only one type (region) of flash memory and LUNs having different numbers of regions of different types of flash memory. Any number of regions and/or combination of types of flash memory are contemplated.

In some standard memory arrangements, the central host controller may handle all the details of which LUN in a MCP, or which portion of memory in a LUN in an MCP, should be used to store data. In compound targets, such as NAND MCPs consisting of multiple flash device types, a micro-tiering technique, as disclosed herein, within each MCP monitors and moves data from flash region to flash region within an MCP based on performance, functionality, endurance, or other criterion. In one embodiment, the micro-tiering manager algorithm seeks to automatically optimize user data blocks in the mixed device-technology hierarchy of a single MCP. This can be performed transparently to the central host processor or cooperatively with the central host processor. In one implementation, the tier manager function is provided by the onboard local processor and firmware within each NAND MCP package.

Figure 7:
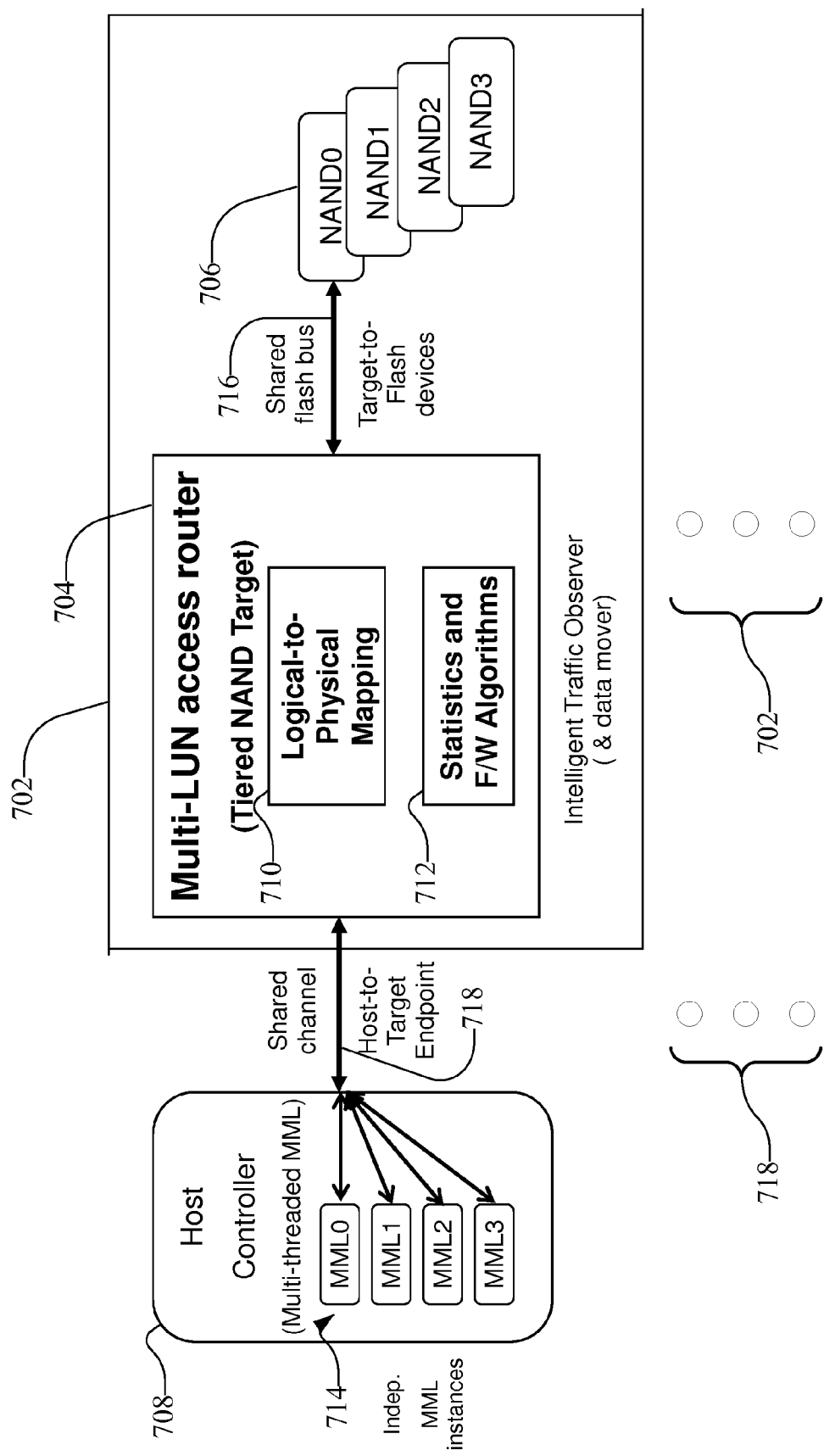
FIG. 7 is a block diagram of an embodiment showing a single MCP package in communication with multiple instances of a memory manager running on the central host processor.

As illustrated in FIG. 7, a tiered NAND target as described with respect to FIG. 1 is shown. The tiered NAND target 702 is a MCP having multiple NAND flash memory dies (also referred to as LUNs) as described in FIG. 2, but is shown in a more simplified manner as a multi-LUN access router that acts as an intelligent data traffic observer and data mover to emphasize the local NAND controller 704 of each tiered NAND target (i.e., MCP) 702 acts as a tier manager for NAND flash memory 706 within the MCP. In the example of FIG. 7, only one of the plurality of tiered NAND targets 702 that is in communication with the central host controller 708 is shown to simplify the discussion. Each of the MCPs 702 communicates with the central host controller 708 over a shared channel 718, while each MCP 702 includes an internal shared flash bus 716 dedicated to the local NAND controller 704 and its NAND flash memory dies 706. Each MCP 702 in the system of FIG. 7 includes one or more logical-to-physical mapping tables 710 that manage the mapping of logical addresses handled by the MCP to the physical addresses of the NAND die 706 in the MCP. As discussed in greater detail below, the MCP 702 includes storage space 712 for firmware algorithms that are executable by the NAND controller in the MCP for functions such as managing the tiers of storage areas in the MCP 702. An additional portion of the storage space 712 in the MCP 702 stores statistics, such as program and erase cycles for the NAND die, the number of accesses to particular logical addresses or physical addresses, the time of last access and/or other criteria for that MCP 702 that the firmware will use to manage the movement of data between the various tiers of memory.

The central host controller 708 in FIG. 7 shows four different threads of memory management logic (MML0-MML3) 714, which may be a memory management system such as STAR as described above, where each thread or instance of the MML 714 is handling different LBA ranges or operations. In one embodiment, each MML thread 714 may be operating concurrently and independently on the central host controller 708 to read or write data to a particular MCP 702, although only one MCP 702 is shown to simplify the illustration. Additional MCPs (not shown, but represented by the ellipses 702 in FIG. 7) may share this host to target channel and/or may reside on additional host channels (ellipses 718 in FIG. 7). All MCPs may be accessed by one or more of the MML threads 714.

Tier Manager Algorithms

In one implementation, each MCP, using the local processor in the MCP, individually handles the movement of data between tiers of physical memory in that MCP. Any of a number of tier management criteria may be executed by the local processor in each MCP to move data to or from a particular tier of memory in one or more of the LUNs in the MCP. Tier manager algorithms can make use of workload or transactional statistics, such as hot count/access frequency, data-unit size, storage fullness, P/E (program/erase) cycle count, time of last access, error rate (e.g. as determined by an ECC algorithm), and etc. to migrate or rearrange data among the available mixed technology flash devices or regions. For example, anticipatory actions by the tier manager of a MCP may provide "always ready" space in the most optimal storage blocks, through pre-emptive relocation of cold data to slower/cheaper flash devices or regions. The local processor in the local NAND controller may be configured to move data from a higher performance tier (e.g. SLC flash) to a lower performance tier (e.g. MLC flash) if the access frequency, hot count, data error rate or other performance statistic is below a pre-determined threshold. Conversely, the local processor in an MCP may move data to a higher performance tier in its MCP if one or more of these storage criteria are above a threshold. These same storage criteria may be used by the local processor or the central host controller for movement of data within a tier as well.

In one embodiment, data management functions may be distributed between the central host controller and each of the local NAND controllers in the MCPs, where the central host controller may be on a host device accessing the storage device or may be integral within a storage device such as an SSD but separate from the NAND controller in each of the plurality of MCPs. The central host controller may utilize multiple flash channel parallelism or "striping" to obtain high write performance. The central host controller may also handle logical data block management, such as handling and tracking valid and obsolete data, or grouping data. The central host controller may also control total address space allocation and host write cache management, including table and index cache management.

Utilizing the MCP architectures of FIGS. 1-7, the local NAND controller in each MCP may be arranged to observe and record transaction information regarding data writes and reads to the LUNs and the condition of the tiers within and/or between the LUNs. Using this statistical information, which may be stored in the local NAND controller, in one or more LUNs in the MCP, or in a combination of the two locations, the local NAND controller may handle data migration between the tiers using its own internal bus 716 rather than burdening the bus 718 between the central host controller and the various MCPs 702 managed by the central host controller 708. The local NAND controller 704 in the MCP 702 may thus utilize its internal bus 716 to free up bandwidth on the host bus 718 for the central host controller 708 to access other devices (e.g. other MCPs) or channels in parallel with the task(s) being handled by the local NAND controller 704 internally to the MCP.

Figure 8:
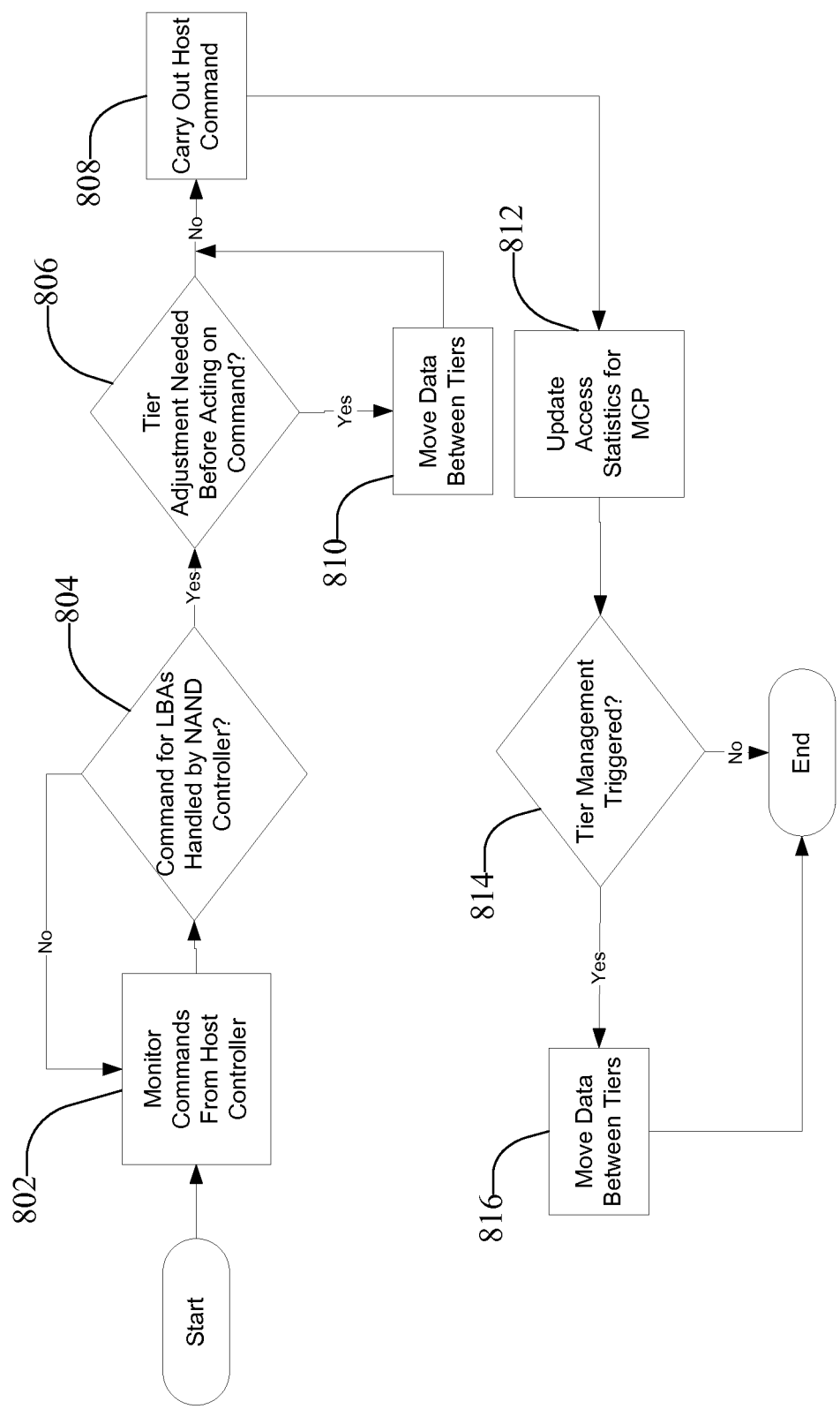
FIG. 8 is a flow chart of an embodiment of a tier optimization method executable in the architectures of FIGS. 1-7.

Referring to FIG. 8, one implementation of micro-tiering in a storage device having a plurality of MCPs, each with a separate local NAND controller, is illustrated. Each local NAND controller monitors central host controller commands for commands directed to logical block addresses managed by the respective NAND controller (at 802, 804). If a local NAND controller sees a central host controller command directed to a logical address in a range handled by its MCP, the local NAND controller for that MCP responds to that command as appropriate (at 804).

If the central host controller is sending a write command to the logical address handled by the MCP then, in certain circumstances, the local NAND controller for that MCP may need to determine if data needs to be moved between tiers (e.g. between regions of different flash within a LUN or between LUNs having different types of flash) in order to handle the write command (at 806). For instance, if the high performance tier is too full to take all the data in the pending write command, then the local NAND controller may first move data from the high performance tier to a lower performance tier prior to carrying out the command (at 810). Preferably, the local NAND controller is configured to move this data pre-emptively or in an anticipatory fashion. Ideally, the local NAND controller is configured to move data from the highest performance tier, or other default tier, and make room for new data writes in order to avoid delaying execution of a host write command, however there may be circumstances, such as when the memory as a whole is getting quite full, when such a delay may become unavoidable.

Assuming there is no need to adjust data between tiers of the specific MCP, the host command may be carried out. In the case of a write command, the data will be written to the MCP and in the case of a read command, the designated data will be read from the appropriate LUN or LUNs in the MCP (at 808). After each command is carried out, the local NAND controller may update one or more entries on the statistics for the data in the MCPs (at 812). The statistics may be include workload or transactional statistics, such as hot count/access frequency, time of last access, data-unit size, storage fullness, P/E (program/erase) cycle count, error rates, and etc.

Depending on the particular tier management algorithm(s) implemented within the particular MCP, the local NAND controller will determine what criteria (e.g. program/erase cycle count, data-unit size, time of last access, etc.) are implicated in the tier management algorithm(s) and determine if the updated access triggers have reached a level that triggers the local NAND controller for a given MCP to move data between one of more different tiers, for example moving data in an SLC memory to a MLC region (at 814). If a trigger point has been reached, then the local NAND controller will move the appropriate data from one tier to another within the MCP (at 816). Typically, the local NAND controller will wait until no command is pending and then move the data between the tiers as appropriate, but there may be instances where managing movement of data between tiers will override the host command priority, such as the case when the high performance tier in the MCP (e.g. SLC flash regions) is too full to take the data directed to the MCP and the NAND controller will move data to a different tier (e.g. MLC flash regions) in the MCP before carrying out the write command.

If no trigger point or threshold has been reached, the process ends and the local NAND controller will continue monitoring for new commands directed to the LUNs in its MCP (at 814, 802). This same process may be carried out concurrently in each of the plurality of MCPs (tiered NAND targets) in a storage device where each local NAND controller monitors and acts on commands directed to logical addresses it is handling and each local NAND controller independently manages the movement of data between tiers in its respective MCP, independent of the other MCPs and independent of the central host controller that is managing the logical address space for all of the MCPs.

Figure 9:
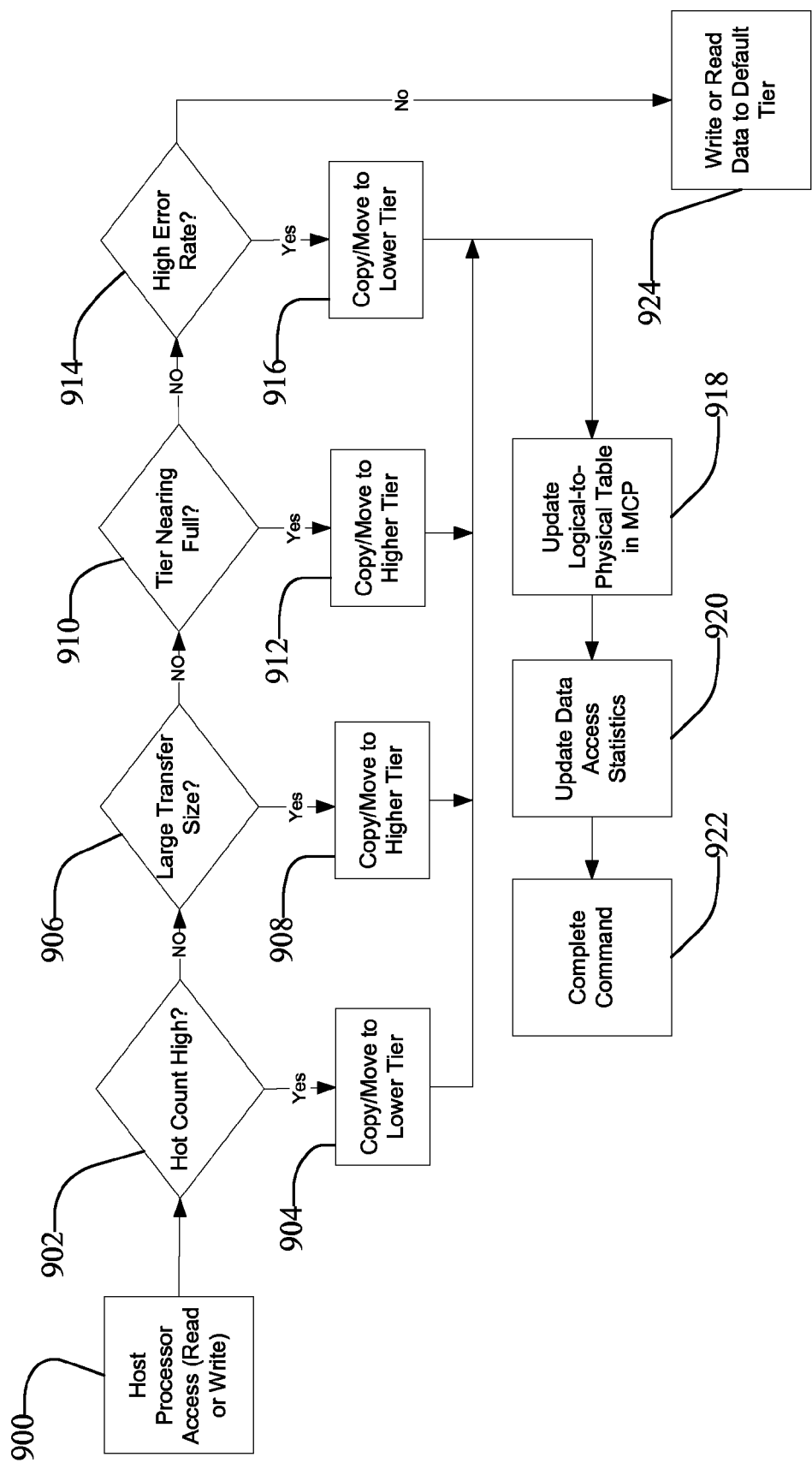
FIG. 9 is a flow chart of an embodiment of a local processor in an MCP using tier optimization criteria to manage the storage of data in different tiers in the MCP.

The movement of data between tiers of a particular MCP by the local NAND controller associated with that particular MCP is disclosed above; however movement of data between tiers of different MCPs is also contemplated in other embodiments. Although an ONFI target (e.g. a compound target such as the disclosed MCP) generally cannot initiate ONFI transactions and therefore cannot optimize data management between MCPs, the MCPs may manage their internal tiers and transmit proposals back to the central host controller for MCP-to-MCP data migration. Although a flash management protocol such as ONFI does not currently allow a target (e.g. an MCP) to initiate a transaction such as sending data between MCPs, other protocols may be used or the ONFI standard can be extended, to provide such a capability. An example of using another protocol to permit the local NAND controller of an MCP to suggest to the central host controller may be the use of a standard mailbox function available in various protocols. Using a mailbox function, where the local NAND controller may set a flag in memory that the central host controller can read, the local NAND controller can alert the central host controller that, for example, its MCP is becoming too full. In other embodiments, the mailbox feature could even be used by a local NAND controller to suggest an alternative MCP to the central host controller. Referring now to FIG. 9, one group of tier management decisions that a local NAND controller may process to handle movement of data between tiers in a MCP is illustrated. It is contemplated that each local NAND controller may utilize these or other combinations of tier management routines. It is further contemplated that the local NAND controller for one MCP may use a different set of tier management routines for its LUNs than used by another local NAND controller in another MCP in the storage device. It is yet further contemplated that the number of tiers in one MCP may differ from the number of tiers in another MCP in the storage device and that each local NAND controller manages the tiers in its respective MCP independently.

With respect to the tier management decisions made by the local NAND controller in FIG. 9, the local NAND controller may receive a read or write command from the host processor directed to logical addresses being handled by the MCP for the local NAND controller and then review the access statistics maintained in the MCP to determine if data needs copying from one tier to another (at 900). If a hot count (number of program/erase cycles for blocks in a tier is above a predetermined threshold, the NAND controller may copy or move data from a higher tier to a lower tier, where the lower tier has a higher endurance than the higher tier (at 902, 904). The hot count may be an average number of program/erase cycles for the tier, or may be block specific in different embodiments. The hot count for the tier may be used for managing tier-to-tier data movement by the local NAND controller, while the block-specific hot count may be used by the local NAND controller (or the central host processor) to relocate data within the same tier (e.g. as part of a wear leveling algorithm). If the data in the MCP is part of a large data run that was transferred, then the local NAND controller may move the data from a lower tier to a higher tier (e.g. from SLC to MLC) based on the assumption that the data in a larger data transfer is less likely to be accessed as frequently, or may reduce storage device performance by taking up too much of the higher performance lower tier storage (at 906, 908).

Another tier management decision that may be made by the NAND controller for its LUNs is whether the lower (higher performance) tier is too full, for example if it has less than a certain percentage of free space available. In this case, the NAND controller may move data from the lower tier to the higher tier to make more room in the higher performance lower tier (at 910, 914). Also, error rate statistics may be monitored for the tiers and when the number of errors or error corrections to the higher tier reaches a threshold, the NAND controller may decide to move or copy data from the higher tier to the lower, more reliable tier (at 914, 916). Once the NAND controller has moved data between tiers based on these or other management criteria, the logical-to-physical table and the data access statistics are updated in the MCP and the command to write or read is completed (at 918, 920, and 922). If none of the tier management thresholds have been met and no data currently needs to be moved between tiers, then the data associated with the host processor command may be written to the default tier. The default tier may be preset to any of the tiers in the MCP, however a lower tier may be a typical default tier to provide the best performance (e.g. burst write speed) for the storage device. When making a tier management decision based on one or more of the various management criteria being monitored, the NAND controller for a given MCP may base its decision to move data between tiers on the statistics applicable to the entire MCP, one region within the MCP, or multiple regions within the MCP. For example, the NAND controller may look at the fullness of the entire MCP, or the fullness of just one or more regions in the MCP when deciding where to route or move data based on a fullness criteria.

In other implementations, each local NAND controller for each MCP in a storage device may also keep track of the specific instance of the MML that has issued a write command via the central host controller and treat data from one instance of the MML differently than data from another instance of the MML. For example, referring again to FIG. 7, if there are four MML threads 714 running on the central host controller and each thread 714 handles a specific range of logical addresses that are striped across all of the MCPs, the local NAND controller 704 in each MCP 702 may have firmware programmed to give certain threads better performance for data managed by those thread than other threads. For example, the NAND controller 704 in each MCP 702 may know to give data from MML2 the best performance storage in the tiers represented by the NAND dies 706, while giving data handled by the other MMLs 714 (MML0-1 and MML3) a less performance storage. Alternatively, each MML thread 714 may have its data treated the same by the MCPs, or each MCP can actively monitor the access patterns or "data traffic" patterns of each instance and keep data of the more active threads of MML in faster tiers of memory while maintaining data from less active MML threads in slower tiers, where faster tiers may be SLC flash and slower tiers may be MLC flash, or higher bit per cell MLC flash memory from among multiple different bit per cell levels of MLC flash memory.

In different implementations, the local NAND controllers in the MCPs of a storage device may be configured through firmware to handle all, some or none of the internal tier management functions such as discussed above, where any tier management tasks not handled by the local NAND controllers may be centrally handled for all MCPs by the central host controller directly. The distribution of tier management tasks to the individual local NAND controllers may be static in the sense that they are not changeable. In other implementations, the distribution of tier management functions between the local NAND controller on each MCP and the central host controller of the storage device may be dynamic such that the central host controller may change the tasks the local NAND controllers will handle. For example, if the processing tasks being demanded of the local NAND controllers are below a threshold or above a threshold, the central host controller may wish to take over the processing tasks to take advantage of its faster processing capabilities than the generally less sophisticated processors of the local controllers. Conversely, if the central host controller is overburdened, it may wish to transfer responsibility for tier management or other flash management tasks to the local controllers in each MCP. In order to implement the dynamic transfer of processing tasks, the central host controller may send pre-designated messages to the local controller of each MCP to alter the functions of the local controllers. The local NAND controllers may inform the central host controller of their respective status using, for example, the same mailbox function described previously. In one embodiment, the central controller may transfer one or more data management tasks (e.g. tier management, wear leveling, etc.) to all the local NAND controllers, or may only transfer certain management tasks to select MCPs while retaining those same management tasks for other MCPs.

In summary, these embodiments can be used to provide a way to optimize data management tasks such that the lower level tier management functions are pushed out to the individual local controllers of the MCPs while freeing up the central host controller for the SSD or other flash storage device. Thus, the system architecture of a SSD or other flash storage device with a central host controller and individual mixed technology multi-chip packages each with their own local NAND controller capable of processing data for the NAND dies in their respective MCP, and the configuration of the local NAND controllers to take on some or all of the tier management burden, can improve performance in the storage device.

CONCLUSION

It is intended that the foregoing detailed description be understood as an illustration of selected forms that the invention can take and not as a definition of the invention. It is only the following claims, including all equivalents that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A mass storage memory device comprising:
a plurality of multi-chip memory packages;
one or more interfaces through which the plurality of multi-chip memory packages may communicate with a central host controller, and
wherein each multi-chip memory package comprises:
a plurality of memory dies, wherein a first portion of the plurality of memory dies is configured as a first type of non-volatile storage and a second portion of the plurality of memory dies is configured as a second type of non-volatile storage; and
a local processor in communication with the plurality of memory dies, the local processor configured to:
receive data in a pre-determined logical block address range from the central host controller;
determine a storage criteria for the received data; and
based on the determined storage criteria, select between one of the first portion or the second portion of memory dies for storing the received data; and
store the received data in the selected one of the first or second portions of memory dies, wherein the storage criteria comprises an access frequency associated with the received data.

2. The mass storage memory device of claim 1, wherein first type of non-volatile storage is a higher endurance form of flash memory than the second type of non-volatile storage.

3. The mass storage memory device of claim 2, wherein the first portion comprises at least one of the plurality of dies or at least one region of one of the plurality of dies and wherein the second portion comprises at least one other of the plurality of dies or at least one other region of the plurality of dies.

4. The mass storage memory device of claim 3, wherein the storage criteria further comprises a fullness of an entire multi-chip memory package, or a fullness of one or more regions.

5. The mass storage memory device of claim 3, wherein the storage criteria further comprises a data-unit size of the received data at the multi-chip memory package.

6. A mass storage memory device comprising:
a plurality of multi-chip memory packages;
one or more interfaces through which the plurality of multi-chip memory packages may communicate with a central host controller, and
wherein each multi-chip memory package comprises:
a plurality of memory dies, wherein a first portion of the plurality of memory dies is configured as a first type of non-volatile storage and a second portion of the plurality of memory dies is configured as a second type of non-volatile storage; and
a local processor in communication with the plurality of memory dies, the local processor configured to:
receive data in a pre-determined logical block address range from the central host controller;
determine a storage criteria for the received data; and
based on the determined storage criteria, select between one of the first portion or the second portion of memory dies for storing the received data; and
store the received data in the selected one of the first or second portions of memory dies, wherein the storage criteria comprises a program/erase count of regions of memory dies of the multi-chip memory package.

7. The mass storage memory device of claim 1, wherein the central host controller is part of a solid-state drive.

8. The mass storage memory device of claim 1, wherein the central host controller is in communication with each multi-chip memory package using a different flash interface channel.

9. The mass storage memory device of claim 8, wherein each flash interface channel supports a plurality of multi-chip memory packages.

10. A method for creating a metablock across multi-chip memory packages, the method comprising:
in a central host controller comprising one or more interfaces through which to communicate with a plurality of multi-chip memory packages, wherein each multi-chip memory package comprises a plurality of memory dies and a local processor:
receiving data for storage in the multi-chip memory packages; and
transmitting data associated with pre-determined logical block addresses to the multi-chip memory packages; and
in the local processor of at least one of the plurality of multi-chip memory packages, wherein a first portion of the plurality of memory dies in the at least one of the plurality of multi-chip memory packages is configured as a first type of non-volatile storage and a second portion of the plurality of memory dies is configured as a second type of non-volatile storage:
receiving a portion of the transmitted data from the central host controller in a pre-determined logical block address range;

determining a storage criteria for the received data, wherein the storage criteria comprises an access frequency associated with the received data; and based on the determined storage criteria, selecting between one of the first portion or the second portion of memory dies for storing the received data; and storing the received data in the selected one of the first or second portions of memory dies.

11. The method of claim 10, wherein first type of non-volatile storage is a higher endurance form of flash memory than the second type of non-volatile storage.

12. The method of claim 10, wherein the first portion comprises at least one of the plurality of dies or at least one region of one of the plurality of dies and wherein the second portion comprises at least one other of the plurality of dies or at least one other region of the plurality of dies.

13. The method of claim 12, wherein the storage criteria further comprises a fullness of the entire multi-chip memory package, or fullness of one or more regions.

14. The method of claim 12, wherein the storage criteria further comprises a data-unit size of the received data at the multi-chip memory package.

15. The method of claim 12, wherein the storage criteria further comprises a program/erase count of the regions of memory dies of the multi-chip memory package.

16. The method of claim 10, wherein the central host controller is part of a solid-state drive.

17. The method of claim 10, wherein the controller is in communication with each multi-chip memory package using a different flash interface channel.

18. The method of claim 17, wherein each flash interface channel supports a plurality of multi-chip memory packages.

* * * * *